United States Patent [19]

Andre et al.

[11] Patent Number: 4,796,207

[45] Date of Patent: Jan. 3, 1989

[54] PROCESS AND APPARATUS FOR ROASTING WITH A ROASTING VESSEL

[75] Inventors: Wolfram K. Andre, Ginsterweg; Kurt Wolf, Langwiesenweg, both of Fed. Rep. of Germany

[73] Assignee: Fissler GmbH, Fed. Rep. of Germany

[21] Appl. No.: 897,319

[22] Filed: Aug. 18, 1986

[30] Foreign Application Priority Data

Aug. 20, 1985 [DE] Fed. Rep. of Germany ....... 3529699

[51] Int. Cl.⁴ .............................................. H05B 1/02
[52] U.S. Cl. ................................... 364/557; 219/494; 426/523; 99/328
[58] Field of Search ............... 364/503, 557, 575, 477, 364/556; 340/589; 374/107, 155, 33, 34; 99/328, 330, 331, DIG. 14; 426/523; 219/492, 494, 497, 490; 123/179 B, 179 K; 236/1 A, 1 B, 2, 3, 15 A, 15 B, 15 BG, 91 A; 165/26, 30; 110/190, 191

[56] References Cited

U.S. PATENT DOCUMENTS

| | | | |
|---|---|---|---|
| 3,523,182 | 8/1970 | Phillips et al. | 219/501 |
| 4,031,365 | 6/1977 | Raggiotti | 364/557 |
| 4,262,737 | 4/1981 | Faillace | 165/30 X |
| 4,301,509 | 11/1981 | Haase et al. | 364/557 |
| 4,461,616 | 7/1984 | Vukovich, Jr. | 236/15 GB X |
| 4,467,184 | 8/1984 | Loessel | 219/509 |
| 4,492,336 | 1/1985 | Takata et al. | 374/107 X |
| 4,493,298 | 1/1985 | Kawamura | 219/492 X |
| 4,511,792 | 4/1985 | Kawamura | 219/492 X |
| 4,521,183 | 6/1985 | Hirai et al. | 236/15 BG X |
| 4,551,618 | 11/1985 | Payne | 219/492 X |
| 4,585,925 | 4/1986 | Andre | 340/589 X |
| 4,586,149 | 4/1986 | Stillman et al. | 364/557 |
| 4,587,405 | 5/1986 | Andre | 340/589 X |
| 4,636,949 | 1/1987 | Longabaugh | 364/557 X |
| 4,674,027 | 6/1987 | Beckey | 364/557 X |
| 4,682,012 | 7/1987 | Wolf et al. | 99/330 X |
| 4,700,052 | 10/1987 | Wolf et al. | 426/523 X |

FOREIGN PATENT DOCUMENTS

2932039 2/1981 Fed. Rep. of Germany .
3342416 4/1985 Fed. Rep. of Germany .

*Primary Examiner*—Parshotam S. Lall
*Assistant Examiner*—Joseph L. Dixon
*Attorney, Agent, or Firm*—Thomas W. Speckman; Ann W. Speckman

[57] ABSTRACT

A process and apparatus for cooking food in a roasting vessel, in which the temperature in and around the roasting vessel is measured and used to regulate the cooking temperature according to a preset program by means of a control circuit which activates and deactivates an electric heating element. By controlling the heat output according to a preset program, whereby the program is effected when a predetermined temperature differential from the preset roasting temperature is reached, the cooking temperature can be controlled without overshooting the preset roasting temperature, even during high rates of temperature increase which occur during the heating cycle of the roasting operation.

10 Claims, 2 Drawing Sheets

CONTROL CYCLES (to)

TEMPERATURE DIFFERENCE
Ta= Tk -Tx [°C]

| ΔT [°C] | 39.6 | 31.9 | 25.3 | 18.7 | 14.3 | 8.8 | 5.5 | 4.4 | 3.3 | 2.2 | 1.1 | 0 | -1.1 | -2.2 | >-2.2 |
|---|---|---|---|---|---|---|---|---|---|---|---|---|---|---|---|
| <-2 | 12 | 12 | 12 | 12 | 12 | 12 | 11 | 10 | 9 | 8 | 7 | 6 | 4 | 2 | 0 |
| -2 | 12 | 12 | 12 | 12 | 12 | 10 | 8 | 7 | 7 | 6 | 6 | 4 | 3 | 2 | 0 |
| -1 | 12 | 12 | 12 | 12 | 10 | 8 | 7 | 6 | 6 | 5 | 4 | 3 | 2 | 1 | 0 |
| 0 | 12 | 12 | 11 | 10 | 8 | 6 | 5 | 4 | 4 | 3 | 3 | 2 | 1 | 1 | 0 |
| 1 | 12 | 11 | 10 | 8 | 6 | 5 | 4 | 3 | 2 | 2 | 0 | | | | |
| 2 | 11 | 10 | 8 | 6 | 4 | 3 | 2 | 0 | | | | | | | |
| 3 | 10 | 8 | 6 | 4 | 2 | 2 | 0 | | | | | | | | |
| 4 | 8 | 6 | 4 | 2 | 0 | | | | | | | | | | |
| 5 | 6 | 4 | 2 | 0 | | | | | | | | | | | |
| 6 | 4 | 2 | 0 | | | | | | | | | | | | |
| 7 | 2 | 0 | | | | | | | | | | | | | |
| 8 | 0 | | | | | | | | | | | | | | |
| 9 | 0 | | | | | | | | | | | | | | |
| 10 | 0 | | | | | | | | | | | | | | |

ΔT    to = 24 sec. = 12 x 2 sec.

Fig.3

PROCESS AND APPARATUS FOR ROASTING WITH A ROASTING VESSEL

BACKGROUND OF THE INVENTION

1. Field of the Invention

The present invention relates to an arrangement for roasting in a roasting vessel, in which the temperature in and/or around the roasting vessel is measured at time intervals and the temperature measurements are used according to a preset program to regulate the cooking temperature by means of a control circuit which activates and deactivates an electric heating element.

In the context of the disclosure of this invention, the term "roasting" refers to any means of cooking without water, including processes whereby the food is roasted without fat.

2. Description of the Prior Art

A cooking apparatus of the general type referred to above is taught in German Patent Publication DE-OS No. 29 32 039. In this prior art arrangement, a timing means is provided which is automatically controlled as a function of the temperature and/or the pressure in the cooking vessel, so as to adjust the cooking or tenderizing process depending on the conditions prevailing inside the cooking vessel. The purpose of this apparatus is to insure that the duration of the cooking or tenderizing process is appropriately adjusted as conditions vary in the cooking vessel. The provision of this type of control arrangement is only important if fluctuating conditions prevail in the cooking vessel during the cooking or tenderizing procedure.

Another cooking apparatus is taught in German Patent DE-PS No. 33 42 416, whereby during the heating phase, the lengths of the time intervals elapsing between reaching two temperatures which are below the boiling temperature of the cooking water as well as the rate of temperature increase during a preset time interval are both measured. The heat output of the heating element can then be modified as a function of the temperature measurements and preset program parameters.

Apparatus which provide a programmed means of controlling heating output are generally desirable for cooking purposes, because the heating phase requires a relatively long time. However, this type of control program requires complex circuitry, since these systems also have to adjust for the type and quantity of food being handled.

When roasting however, totally different conditions prevail. The heating phase is extremely short and consequently the control regulating system is required to start operating at a much earlier stage.

SUMMARY OF THE INVENTION

An objective of the present invention is to provide an apparatus of the type referred to above, whereby a preset roasting temperature is regulated by means of a simplified control circuit, which also serves to prevent any large degree of temperature overshooting.

These objectives are met by the process and apparatus of the present invention wherein the temperature difference between the preset roasting temperature and the measured temperature is determined and compared with a predetermined temperature differential established within about 30°–50° C. range below the preset roasting temperature. When the measured temperature difference exceeds the aforesaid predetermined temperature differential, the control circuit, which utilizes a known type of period group control system, activates the electric heating element to full heat output for the remaining time intervals in the control cycle. If the measured temperature difference is less than the aforesaid predetermined temperature differential, however, the temperature difference is measured at regular time intervals and, dependent on the measured temperature difference and a measured temperature differential during a control cycle, the control circuit activates the electrical heating element for only a certain number of time intervals during the subsequent control cycle according to a preset program stored in the program memory. The number of time intervals during which the electric heating element is activated during the next cycle decreases as the measured temperature difference decreases and increases as the measured temperature differential decreases.

The aforesaid predetermined temperature differential is selected at a broad range so that the heat output is regulated at an early stage of the roasting process. The process and apparatus according to the present invention is simplified in that the measured temperature difference is derived from the control circuit as well. A simplified arrangement results if the control circuit is operated according to known period group control systems, whereby the heat output is varied by lengthening or shortening the duration of the activated period, and the heating element is operated in an on or off mode.

According to one embodiment of the present invention, the measured temperature difference is continuously compared with the aforesaid predetermined temperature differential as soon as the apparatus is activated.

In another embodiment, the apparatus is designed so that as soon as it is switched on, the control circuit maintains the electric heating element continuously activated and the temperature difference is not measured until the predetermined temperature differential from the preset roasting temperature is reached, at which point a comparison is made using the measured temperature difference.

The electric heating element may remain activated at full heat output until the predetermined temperature differential is reached by remaining activated during all time intervals of the period group control cycles until the predetermined temperature differential is reached.

In yet another embodiment of the present invention, the measured temperature differential during each cycle is derived from measurement of a differential between the temperature levels at the beginning and at the end of the period group control cycle. To reduce the influence of short term temperature fluctuations, temperature measurements may be taken at intervals at the beginning and at the end of each cycle, and mean temperature values may be determined, from which the measured temperature differential during each cycle is derived.

According to another embodiment, to operate the control circuit with digital signals, the measured temperature differences as well as the measured temperature differentials are measured during the same time intervals and transmitted in the form of a predetermined series of incremental temperature steps, these digital values are transmitted to the program memory, which provides, in the form of a digital signal, the number of time intervals during the following cycle in which the electric heating element is maintained at full heat output. With a 2 kW heating element, for example, a periodic group control arrangement may be provided which operates on a twelve 2 second cycles (12×2 sec.) whereby the program memory provides input commands to the control circuit with a 0–12 parameter range, providing activation and deactivation of the 2 kW electric heating element without any perceptible effect on the a.c. power supply.

BRIEF DESCRIPTION OF THE DRAWINGS

The present invention will now be described in detail with the aid of specific embodiments illustrated in the drawings, wherein:

FIG. 3 shows a program stored in the program memory.

DESCRIPTION OF PREFERRED EMBODIMENTS

Figure 1:
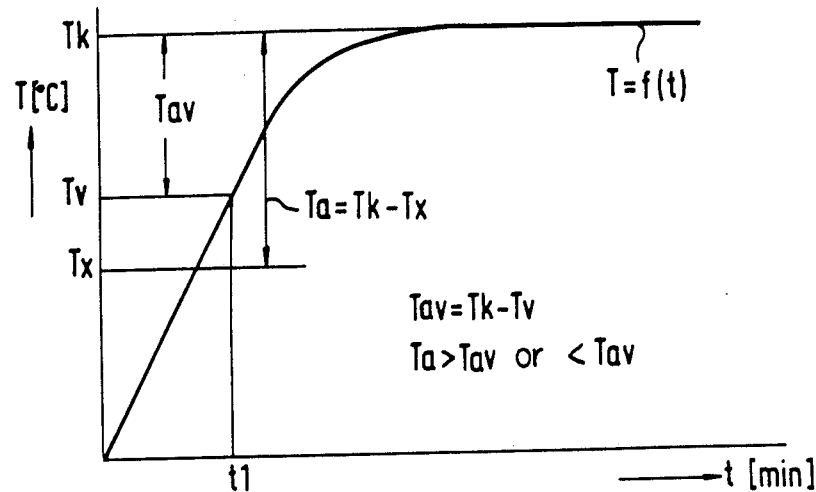
FIG. 1 shows a temperature/time characteristic curve for the total roasting system comprising the electric heating element, the roasting vessel and the food to be processed.

Temperature/time characteristic curve T=f(t), as shown in FIG. 1, for a total roasting system shows the rate of the temperature increase of the entire system comprising the heating element, the roasting vessel and the food to be cooked. Roasting temperature Tk is preset and constant. Temperature difference Ta between preset roasting temperature Tk and actual measured temperature Tx is determined. At the same time, a predetermined temperature differential Tav of about 30°–50° C. is selected as a reference value. Whenever measured temperature difference Ta exceeds predetermined temperature differential Tav, the heating element is activated to full heat output. As soon as predetermined temperature Tv is reached at time t1 or as soon as the measured temperature difference Ta is less than the predetermined temperature differential Tav, the heat output is reduced according to a preset program which takes into account measured temperature difference Ta and the temperature differential ΔT measured during a cycle (to) corresponding to the operating cycle of the period group control system. In this way, the rate at which the measured temperature approaches preset roasting temperature Tk is reduced and regulated to prevent the system from overshooting preset roasting temperature Tk.

Figure 2:
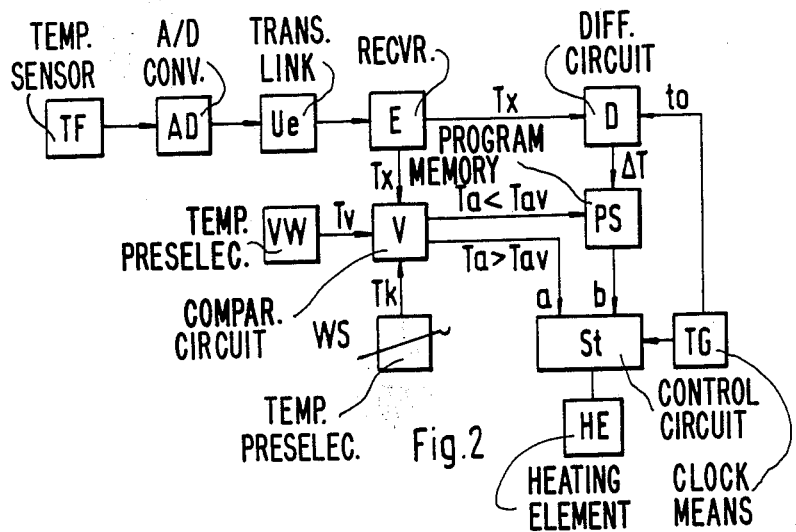
FIG. 2 shows a schematic circuit diagram of an apparatus according to the present invention.

The mode of operation of the apparatus according to the present invention is shown in greater detail in the block circuit diagram of FIG. 2. The temperature in or around the roasting vessel is measured by temperature sensor TF. This measurement is converted by analog/digital convertor AD to a digital signal which is then transmitted to receiver E by transmission link Ue. The temperature signal corresponding to measured temperature Tx is transmitted to comparator circuit V, to which predetermined temperature Tv is transmitted by temperature preselector VW, whereby a predetermined temperature differential Tav of about 30° to 50° C. is maintained between predetermined temperature Tv and preset roasting temperature Tk. Roasting temperature Tk is preselected by setting switch WS.

Comparator circuit V determines measured temperature difference Ta. If measured temperature difference Ta exceeds predetermined temperature differential Tav between preset roasting temperature Tk and predetermined temperature Tv, comparator circuit V transmits input (a) to control circuit St, which results in continuous heat output of electric heating element HE. Control circuit St operates in the familiar periodic group control mode for cycles (to) of multiple time intervals. A cycle (to) may, for example, correspond to twelve 2 second time intervals. As long as control circuit St receives the input signal (a), heating element HE remains activated at full heat output throughout the twelve time intervals in the next operating cycle (to).

If measured temperature difference Ta determined by comparator circuit V is less than predetermined temperature differential Tav between preset roasting temperature Tk and predetermined temperature Tv, the heat output of heating element HE must be reduced during the following cycle according to a program stored in program memory PS, which takes into account measured temperature difference Ta as well as measured temperature differential ΔT which is determined during each control cycle (to) by differential circuit D shown in FIG. 2. In this mode, at the beginning and at the end of each control cycle (to), measured temperature Tx is stored and a mean temperature for each control cycle (to) is determined. Temperature differential ΔT represents these mean temperature parameters so as to eliminate, or at least considerably reduce, the influence of short term temperature fluctuations.

Measured temperature difference Ta and measured temperature differential ΔT are transmitted to program memory PS. It is preferable for measured temperature difference Ta and measured temperature differential ΔT to be transmitted as whole number multiples of temperature increments, such as 1.1° or 1° C., to maintain control functions in the digital mode. As shown, in the table in FIG. 3, program memory PS selects and transmits a control signal (b) which falls within a 0–12 parameter range when it is supplied with the appropriate signals. Program memory PS determines the number of time intervals during which electric heating element HE will be activated to full heat output in the following cycle (to). If measured temperature difference Ta amounts to 4 temperature increments or 4.4° C. for example, and measured temperature differential ΔT represents a decrease of 1 temperature increment, program memory PS will select and transmit a signal representing 6 as input b to control circuit St. In the next control cycle (to), electric heating element HE will be activated by control circuit St to full heat output for six time intervals, following which the heating element will be deactivated for the next six time intervals of the control cycle.

The table in FIG. 3 shows, as values of the parameters for measured temperature difference Ta and measured temperaure differential ΔT, the number of time intervals in the next control cycle (to), during which electric heating element HE remains activated. This demonstrates that the number of activated time intervals diminishes as measured temperature difference Ta is reduced and increases progressively as measured temperature differential ΔT diminishes.

Control circuit St is provided with a clock means TG which defines the time intervals in control cycle (to) and defines time intervals for derivation of measured temperature differential ΔT by differential circuit D.

We claim:

1. An apparatus for temperature regulation in a roasting system comprising food to be roasted, a roasting vessel and a heating element, said apparatus comprising:

a temperature sensor (TF) measuring the temperature (Tx) at said roasting vessel and transmitting a measured temperature (Tx) signal;

a temperature setting switch (WS) for selecting a preset roasting temperature (Tk) and transmitting a preset roasting tempeature (Tk) signal;

a temperature preselection means (VW) for selecting a predetermined temperature (Tv) less than said roasting temperature (Tk) and transmitting a predetermined temperature (Tv) signal;

a comparator circuit (v) receiving said signals corresponding to said measured temperature (Tx), said preset roasting temperature (Tk), said preset roasting temperature (Tk), and said predetermined temperature (Tv), and deriving a measured temperature difference (Ta) by subtracting said measured temperature (Tx) from said preset roasting temperature (Tk) and a predetermined temperature differential (TaV) by subtracting said predetermined temperature (Tv) from said preset roasting temperature (Tk), comparing said measured temperature difference (Ta) with said predetermined temperature differential (Tav), and emitting a signal (a) when said measured temperature difference (Ta) is greater than said predetermined temperature differential (Tav);

a clock means (TG) generating period group control cycles (to) representing a plurality of time intervals;

a differential circuit (D) receiving signals corresponding to said measured temperature (Tx) and said period group control cycles (to), deriving a measured temperature differential ($\Delta T$) during each said period group control cycle and transmitting a measured temperature differential ($\Delta T$) signal for each said cycle;

a program memory (PS) having a preset program selecting and transmitting a signal (b) from said signals corresponding to said measured temperature differentials ($\Delta T$) and said measured temperature differences (Ta) when said measured temperature difference (Ta) is less than said predetermined temperature differential (Tav);

a control circuit (St) comprising a period group control system activating said heating element (HE) to maintain full heat output during all said time intervals of the subsequent said cycle (to) in response to said signal (a) and activating said heating element (HE) to maintain full heat output during less than all of said time intervals of the subsequent said control cycles (to) in response to said signal (b), whereby the number of said time intervals said heating element (HE) is activated decreases as said measured temperature difference (ta) decreases and increases as said measured temperature differential ($\Delta T$) decreases.

2. An apparatus according to claim 1, wherein said predetermined temperature (Tv) is about 30° to about 50° C. less than said preset roasting temperature (Tk).

3. An apparatus according to claim 1, wherein said comparator circuit (V) derives said measured temperature difference (Ta) continuously and compares it with said predetermined temperature differential (Tav) as soon as the apparatus is activated.

4. An apparatus according to claim 1, wherein as soon as said apparatus is activated, said control circuit (St) switches on and thereby activates said heating element (HE) and said comparator circuit (v) derives said measured temperature difference (Ta) only when said predetermined temperature differential (Tav) has beeen reached, and then a comparison between said measured temperature difference (Ta) and said predetermined temperature differential (Tav) is initiated.

5. An apparatus according to claim 1, wherein said measured temperature differential ($\Delta T$) is derived from averaging temperature measurements (Tx) at the beginning and at the end of each said periodic group control cycle (to).

6. An apparatus according to claim 5, wherein several of said temperature measurements (Tx) are taken at the beginning and at the end of each said control cycle (to), and said differential circuit determines mean temperature values from which said measured temperature differential ($\Delta T$) is derived.

7. A process for temperature regulation in a roasting system comprising food to be roasted, a roasting vessel and a heating element, said process comprising the steps of:

measuring the temperature (Tx) at said roasting vessel;

setting a preset roasting temperature (Tk);

establishing a predetermined temperature differential (Tav) between said roasting temperature (Tk) less than said roasting temperature (Tk);

deriving a measured temperature difference (Ta) between said preset roasting temperature (Tk) and said measured temperature (Tx);

comparing said measured temperature difference (Ta) to said predetermined temperature differential (Tav);

maintaining said heating element at full heat output for all time intervals comprising an entire period group control cycle (to) when said measured temperature difference (Ta) is greater than said predetermined temperature differential Tav); and maintaining said heating element at full heat output for less than all said time intervals comprising said period group control cycle (to) when said measured temperature difference (Ta) is less than said predetermined temperature differential (Tav).

8. An apparatus for temperature regulation in a roasting system comprising food to be roasted, a roasting vessel and a heating element, said apparatus comprising:

a temperature sensor (TF) measuring the temperature (Tx) at said roasting vessel and transmitting a measured temperature (Tx) signal;

a temperature setting switch (WS) for selecting a preset roasting temperature (Tk) and transmitting a preset roasting temperature (Tk) signal;

a temperature preselection means (VW) for selecting a predetermined temperature (Tv) less than said roasting temperature (Tk) and transmitting a predetermined temperature (Tv) signal;

a comparator circuit (V) receiving said signals corresponding to said measured temperature (Tx), said preset roasting temperature (Tk), said preset roasting temperature (Tk), and said predetermined temperature (Tv), and deriving a measured temperature difference (Ta) by subtracting said measured temperature (Tx) from said preset roasting temperature (Tk) and a predetermined temperature differential (Tav) by subtracting said predetermined temperature (Tv) from said preset roasting temperature (Tk), comparing said measured temperature difference (Ta) with said predetermined temperature differential (Tav), and emitting a signal (a)

when said measured temperature difference (Ta) is greater than said predetermined temperature differential (Tav);

a clock means (TG) generating period group control cycles (to) representing a plurality of time intervals;

a differential circuit (D) receiving signals corresponding to said measured temperature (Tx) and said period group control cycles (to), deriving a measured temperature differential ($\Delta T$) from averaging temperature measurements (Tx) at the beginning and at the end of each said periodic group control cycle (to) during each said period group control cycle and transmitting a measured temperature differential ($\Delta T$) signal for each said cycle;

a program memory (PS) having a preset program selecting and transmitting a signal (b) from said signals corresponding to said measured temperature differentials ($\Delta T$) and said measured temperature differences (Ta) when said measured temperature differences (Ta) is less than said predetermined temperature differential (Tav) wherein said measured temperature difference (Ta) and said measured temperature differential ($\Delta T$) are measured, converted to digital signals, and transmitted as a whole number multiples of temperature increments whereby said digital signals ae transmitted to said program memory (FS), which derives said signal (b) as a digital signal representing the number of said time intervals in said control cycle (to) during which said heating element (HE) is activated at full heat output;

a control circuit (St) comprising a period group control system activating said heating element (HE) to maintain full heat output during all said time intervals of the subsequent said cycle (to) in response to said signal (a) and activating said heating element (HE) to maintain full heat output during less than all of said time intervals of the subsequent said control cycles (to) in response to said signal (b), whereby the number of said time intervals said heating element (HE) is activated decreases as said measured temperature difference (ta) decreases and increases as said measured temperature differential ($\Delta T$) decreases.

9. An apparatus according to claim 8, wherein said control circuit (St) comprises a periodic group control system operating on twelve 2 second time interval control cycles (to), and said program memory (PS) provides said signal (b) to said control circuit (St) over a 0-12 parameter range.

10. An apparatus for temperature regulation in a roasting system comprising food to be roasted, a roasting vessel and a heating element, said apparatus comprising:

a temperature sensor (TF) measuring the temperature (Tx) at said roasting vessel and transmitting a measured temperature (Tx) signal;

a temperature setting switch (WS) for selecting a preset roasting temperature (Tk) and transmitting a preset roasting temperature (Tk) signal;

a temperature preselection means (VW) for selecting a predetermined temperature (Tv) less than said roasting temperature (Tk) and transmitting a predetermined temperature (Tv) signal;

a comparator circuit (V) receiving said signals corresponding to said measured temperature (Tx), said preset roasting temperature (Tk), said preset roasting temperature (Tk), and said predetermined temperature (Tv), and deriving a measured temperature difference (Ta) by subtracting said measured temperature (Tx) from said preset roasting temperature (Tk) and a predetermined temperature differential (Tav) by subtracting said predetermined temperature (Tv) from said preset roasting temperature (Tk), comparing said measured temperature difference (Ta) with said predetermined temperature differential (Tav), and emitting a signal (a) when said measured temperature difference (Ta) is greater than said predetermined temperature differential (Tav);

a clock means (TG) generating period group control cycles (to) representing a plurality of time intervals;

a differential circuit (D) receiving signals corresponding to said measured temperature (Tx) and said period group control cycles (to), deriving a measured temperature differential ($\Delta T$) during each said period group control cycle and transmitting a measured temperature differential ($\Delta T$) signal for each said cycle;

a program memory (PS) having a preset program selecting and transmitting a signal (b) from said signals corresponding to said measured temperature differentials ($\Delta T$) and said measured temperature differences (Ta) when said measured temperature difference (Ta) is less than said predetermined temperature differential (Tav) wherein said measured temperature difference (Ta) and said measured temperature differential ($\Delta T$) are measured, converted to digital signals, and transmitted as a whole number multiples of temperature increments whereby said digital signals are transmitted to said program memory (PS), which derives said signal (b) as a digital signal representing the number of said time intervals in said control cycle (to) during which said heating element (HE) is activated at full heat output;

a control circuit (St) comprising a period group control system activating said heating element (HE) to maintain full heat output during all said time intervals of the subsequent said cycle (to) in response to said signal (a) and activating said heating element (HE) to maintain full heat output during less than all of said time intervals of the subsequent said control cycles (to) in response to said signal (b), whereby the number of said time intervals said heating element (HE) is activated decreases as said measured temperature difference (ta) decreases and increases as said measured temperature differential ($\Delta T$) decreases.

* * * * *